United States Patent
Berger et al.

(10) Patent No.: US 11,549,397 B2
(45) Date of Patent: Jan. 10, 2023

(54) TURBOCHARGER WITH A FLUID-DYNAMIC SLIDE BEARING, OR FLUID-DYNAMIC SLIDE BEARING

(71) Applicants: BMTS Technology GmbH & Co. KG, Stuttgart (DE); Martin Berger, Oberderdingen (DE)

(72) Inventors: Martin Berger, Oberderdingen (DE); Rüdiger Kleinschmidt, Besigheim (DE); Frieder Stetter, Stuttgart (DE); Oliver Kuhne, Stuttgart (DE); Steffen Schmitt, Ditzingen (DE)

(73) Assignee: BMTS Technology GmbH & Co. KG

( * ) Notice: Subject to any disclaimer, the term of this patent is extended or adjusted under 35 U.S.C. 154(b) by 0 days.

(21) Appl. No.: 17/299,003

(22) PCT Filed: Nov. 22, 2019

(86) PCT No.: PCT/EP2019/082255
§ 371 (c)(1),
(2) Date: Jul. 14, 2021

(87) PCT Pub. No.: WO2020/114805
PCT Pub. Date: Jun. 11, 2020

(65) Prior Publication Data
US 2022/0065132 A1    Mar. 3, 2022

(30) Foreign Application Priority Data

Dec. 3, 2018 (DE) .................... 10 2018 130 706.3

(51) Int. Cl.
*F01D 25/16* (2006.01)
(52) U.S. Cl.
CPC ........ *F01D 25/166* (2013.01); *F05D 2220/40* (2013.01); *F05D 2240/53* (2013.01)
(58) Field of Classification Search
CPC ..... F01D 25/166; F05D 2240/53; F16C 27/02
See application file for complete search history.

(56) References Cited

U.S. PATENT DOCUMENTS

| 5,518,319 A | 5/1996 | Selby |
| 5,789,839 A * | 8/1998 | Langenbeck ......... F16C 33/107 310/90 |

(Continued)

FOREIGN PATENT DOCUMENTS

| DE | 850093 C | 9/1952 |
| DE | 102008059598 A1 | 6/2010 |

(Continued)

OTHER PUBLICATIONS

International Search Report for corresponding International patent application No. PCT/EP/2019/082255, dated Mar. 12, 2020, 12 pages (not prior art).

(Continued)

*Primary Examiner* — Jesse S Bogue
(74) *Attorney, Agent, or Firm* — Lucian Wayne Beavers; Patterson Intellectual Property Law, PC (57) ABSTRACT

The invention relates to an exhaust gas turbocharger having a fluid dynamic bearing having a rotor (10) and a counter-bearing part (50) assigned to the rotor (10), wherein a rotor bearing surface of the rotor (10) and a counterface of the counter-bearing part (50) face each other, to form a fluid dynamic bearing, wherein the rotor bearing surface and/or the counterface form(s) a continuous bearing contour when cut longitudinally and through the axis of rotation (R) in sectional view, which bearing contour(s) are formed of at least two contour sections (44.1 to 44.3; 53.1 to 53.3) to generate fluid dynamic load capacities in both the radial and the axial directions, wherein the bearing surface of the rotor (10) is formed by a rotor part (40), which is connected to a rotor shaft (11) and is secured on the rotor shaft (11), and wherein the rotor part (40) is supported relative to the rotor shaft (11) in the area of a support section (14) of the rotor shaft (11). In order to be able to provide such an exhaust gas turbocharger with a compact and efficient bearing arrange- (Continued)

ment having a fluid dynamic bearing, wherein at the same time the fluid dynamic bearing can be easily mounted using few parts, provision is made according to the invention that the support section (14) and at least one of the contour sections (53.1 to 53.3) of the counter-bearing part (50) at least sectionally overlap in the direction of the axis of rotation (R).

17 Claims, 3 Drawing Sheets

(56) References Cited

U.S. PATENT DOCUMENTS

| | | | |
|---|---|---|---|
| 9,790,812 | B2 | 10/2017 | Ryu |
| 10,393,169 | B2 | 8/2019 | Berger |
| 10,424,992 | B2 | 9/2019 | Bruckhoff et al. |
| 10,670,071 | B2 | 6/2020 | Berger |
| 2008/0232729 | A1 | 9/2008 | Petitjean et al. |
| 2015/0093233 | A1* | 4/2015 | Daguin .................. F16C 35/02 415/111 |
| 2015/0118044 | A1* | 4/2015 | Hippen .................. F01D 15/10 415/229 |
| 2017/0159708 | A1 | 6/2017 | Uneura et al. |
| 2018/0023620 | A1* | 1/2018 | Berger ................. F16C 17/105 384/107 |
| 2018/0073553 | A1* | 3/2018 | Kleinschmidt ....... F16C 17/028 |
| 2021/0310372 | A1* | 10/2021 | Berger ................. F16C 17/105 |

FOREIGN PATENT DOCUMENTS

| | | |
|---|---|---|
| DE | 102014014962 A1 | 4/2016 |
| DE | 202016105071 U1 | 12/2016 |
| DE | 102015009167 A1 | 1/2017 |
| EP | 1972759 B1 | 12/2015 |
| WO | 2014105377 A1 | 7/2014 |
| WO | 2016146189 A1 | 9/2016 |

OTHER PUBLICATIONS

German Office Action for corresponding patent application No. DE 10 2018 130 706.3, dated Jul. 26, 2019, 22 pages (not prior art).
VDI 2204 (120 pages) (Sep. 1992).
Niemann, G.; Winter, H.; B.-R.: Maschinenelemente, dated Mar. 2001, 64 pages.
Co-pending U.S. Appl. No. 17/298,342, filed May 28, 2021 (not prior art).
Co-pending U.S. Appl. No. 17/298,309, filed May 28, 2021 (not prior art).
DIN 31 652 Part 1 (16 pages) (Apr. 1983).
DIN 31 652 Part 2 (19 pages) (Feb. 1983).
DIN 31 653 Part 1 (16 pages) (May 1991).
DIN 31 653 Part 2 (8 pages) (May 1991).
DIN 31 653 Part 3 (3 pages) (Jun. 1991).
DIN 31 654 Part 1.
DIN 31 654 Part 2.
DIN 31 654 Part 3.
Office action dated Jul. 6, 2022 in U.S. Appl. No. 17/298,309 (not prior art).

* cited by examiner

TURBOCHARGER WITH A FLUID-DYNAMIC SLIDE BEARING, OR FLUID-DYNAMIC SLIDE BEARING

The invention relates to an exhaust gas turbocharger having a fluid dynamic bearing having a rotor and a counter-bearing part assigned to the rotor, wherein a rotor bearing surface of the rotor and a counterface of the counter-bearing part face each other to form a fluid dynamic bearing, wherein the rotor bearing surface and/or the counterface, when cut longitudinally and through the axis of rotation in sectional view, form(s) a continuous bearing contour forming at least two merging contour sections, to generate fluid dynamic load capacities in both the radial and in the axial direction, wherein the bearing surface of the rotor is formed by a rotor part, which is connected to a rotor shaft and is secured on the rotor shaft, and wherein the rotor part is supported relative to the rotor shaft in the area of a support section of the rotor shaft.

The invention also relates to such a fluid dynamic bearing having such a rotor and a counter-bearing part.

In the context of this invention, fluid dynamic bearings shall denote in particular hydrodynamic bearings. In the context of the invention, such hydrodynamic bearings are operated using a liquid lubricant, for example oil, an oil mixture or water.

Further, in the context of this invention, fluid dynamic bearings shall be defined as aerodynamic journal bearings using any type of gas as a lubricant. In particular, air, hydrogen or another gas can be used as a lubricant.

Rotating machine elements, such as shafts, track rollers, gears or pump impellers, require guidance in the radial and axial directions to be able to transfer forces and torques. This task can be performed by hydrodynamically acting bearings. The function of this type of bearing is based on the physical principle of hydrodynamic pressure generation. In hydrodynamic bearings, a suitable lubricant is secured between the rotor and the stator (counter-bearing part). When the rotor rotates relative to the stator, shear forces are generated in the lubricant, which shear forces then transport the lubricant through the bearing at a certain speed. For a converging bearing gap, this results in an increase in hydrodynamic pressure. When the gap diverges—downstream of the converging bearing gap, the pressure drops. If the relative speed between the rotor and stator is sufficiently high, the hydrodynamic pressure causes a sufficiently thick lubricant layer to build up, separating the two sliding partners. In this operating state, friction occurs in the lubricant layer (liquid friction). The hydrodynamic pressures generated in this way, in conjunction with the surface area used, balance the external forces and describe the load capacity of the plain bearing. No additional energy in the form of pressure work or a volume of lubricant supplied via grooves or pockets at a specific pressure is required to generate the hydrodynamic pressure. The load capacity results from the operating data. The fundamentals of the numerical computation of hydrodynamic pressure are presented in DIN 31652 Part 1 (DIN-Taschenbuch 198; Gleitlager 2; Beuth Verlag GmbH; Berlin, Köln 1991).

The state of the art comprises two basic types of bearings:
1. Hydrodynamic journal bearings Hydrodynamic journal bearings are often designed as cylindrical bushings as a segmented variant or as tilting-pad bearings. See also (DIN 31652 Part 2 and VDI Guidelines 2204). The hydrodynamically effective elements (e.g. segments) of the plain bearing are cylindrical and thus arranged in parallel to the axis of rotation. The converging course of the gap results from the eccentric position of the rotor relative to the stator.

2. Hydrodynamic thrust bearings

Hydrodynamic thrust bearings are designed in the form of a thrust washer having various grooves or surface modifications in the form of retaining edges, key surfaces or spiral grooves. They can also be designed as so-called tilting-pad thrust bearings (see DIN 31653 Parts 1 to 3; DIN 31654 Parts 1 to 3). The thrust bearing is arranged orthogonally to the axis of rotation, having generally a rotating thrust collar as a mating partner. The converging course of the gap required for the generation of hydrodynamic pressure results from the design of the surface structures (pockets, ramps, etc.), from the inclination of the tiltable segments or from an angular offset between the bearing and the thrust collar.

If a technical solution results in both radial and axial loads, both of the bearing types mentioned above have to be used. The axial loads are then transferred via a thrust bearing and the radial loads via the journal bearing. The two bearing types then each have to be computed and designed separately, resulting in correspondingly high costs in both design and production.

An exhaust gas turbocharger is known from DE 10 2008 059 598 A1. It has a shaft bearing a turbine wheel and compressor wheel at its ends. Two hydrodynamic bearings support the shaft in a housing. They have the form of taper bearings.

Another exhaust gas turbocharger is described in WO 2014/105377 A1 and EP 1 972 759 B1. High-speed rotors supported in bearings as disclosed in EP 1 972 759 B1 are usually characterized by a relatively low load capacity, in particular in the radial direction. Because of the method of generating the hydrodynamic support film in such bearings, relatively stiff damping characteristics are required of the bearing, which in turn necessitate a relatively long design of the journal bearing to be able to transfer the radial loads resulting from the radial accelerations.

DE 20 2016 105 071 U1 describes an exhaust gas turbocharger that supports a rotor in a bearing housing. The rotor has a rotor shaft rotatably secured within a counter bearing. Hydrodynamic bearings are provided between the rotor and the counter bearing on opposite sides of the counter bearing. For this purpose, the rotor and the counter bearing form bearing contours. The bearing contours are composed of contour sections. The bearing contours form continuous geometries in sectional view for a section along and through the axis of rotation. The continuous bearing contours are geometrically designed such that they can be continuously differentiated in sectional view and along the axis of rotation. This results in high-performance hydrodynamic bearings that can transfer both axial and radial loads in a very small space. Because of this compact design, however, high bearing forces have to be reliably transferred. In the turbocharger known from DE 20 2016 105 071 U1, a sealing bush is used in the area of the compressor wheel to reduce the cost of parts. It is designed like a rotor part that is pushed onto the rotor shaft. This rotor part forms the bearing contour of the rotor in the hydrodynamic bearing. At the same time, the rotor part has a seal mount, for instance in the form of one or more piston ring grooves, which can, for instance, hold a piston ring and in that way seal the interior of the bearing housing against the compressor housing of the exhaust gas turbocharger. The rotor part is pushed onto the rotor shaft with a precise fit to ensure the smallest possible radial clearance.

The invention addresses the problem of providing an exhaust gas turbocharger with a compact and efficient bearing arrangement having a fluid dynamic, in particular hydrodynamic, bearing, wherein the fluid dynamic bearing can be easily mounted using few parts.

The invention also addresses the problem of providing such a fluid dynamic bearing.

The problem of the invention relating to the exhaust gas turbocharger or the fluid dynamic bearing is solved in that the support section and at least one of the contour sections of the counter-bearing part overlap at least sectionally in the direction of the axis of rotation.

During operation, high bearing forces are generated in the area of the fluid dynamic bearing, as was mentioned above in the discussion of the state of the art. The inventors have now realized that a reliable load transfer of these, in particular high radial loads from the fluid dynamic bearing to the rotor shaft is required to guarantee reliable operation. According to the invention, it is proposed to overlap the support section supporting the rotor part relative to the rotor shaft in the direction of the axis of rotation with at least one of the contour sections of the counter-bearing part, preferably with the bearing area, which largely supports the radial loads. In this way, a direct force transfer in the radial direction and on a direct path from this contour section via the support section into the rotor shaft is achieved. The rotor part remains easy to mount, as it can be pushed for instance onto the rotor shaft, wherein the support section then is assigned to the corresponding bearing area of the rotor part. In the assembled state, the rotor part is secured in a particularly tilt-resistant manner, which means that the lubricant gap in the fluid dynamic bearing is reliably maintained during operation, even for changing loads.

According to a preferred variant of the invention provision can be made that the rotor part has a bearing area forming the contour sections, and that the bearing area is arranged such that at least one of these contour sections overlaps the support section at least sectionally in the direction of the axis of rotation. The fact that the rotor part directly forms the contour sections for the bearing area significantly reduces the number of parts required. Owing to the small number of components of the plain bearing, in the bearing area adjoining the support section in the radial direction, the sum of the manufacturing tolerances in this direction is also minimized, resulting in a dimensionally accurate and easily reproducible finished bearing arrangement, in which the bearing clearance in the fluid dynamic bearing can be precisely observed.

According to a preferred embodiment of the invention provision can be made that the radial clearance between the support section of the rotor shaft and the area of the rotor part abutting the support section is smaller than the radial clearance between the rotor part and the thrust bearing part, preferably less than 80%, particularly preferably less than 60% of the radial clearance between the rotor part and the thrust bearing part.

It has been shown that a snug fit between the support section of the rotor shaft and the bearing area of the rotor part results in a reliably operating plain bearing if a snug fit is provided between the support section of the rotor shaft and the area of the rotor part abutting the support section, which snug fit has a relative radial bearing clearance between the rotor and stator of the fluid dynamic bearing in the range from −6 to +6 per mil, in relation to the diameter of the support section. A good compromise between the unbalance behavior of the rotor and an easy assembly of the rotor part is achieved if provision is made that a radial clearance is formed in this fit in accordance with the ISO basic tolerance class IT3 to IT8.

An arrangement designed in accordance with one or more of the above sizing specifications is particularly suitable for use in an exhaust gas turbocharger for a passenger car. In particular, only minor imbalances occur with such an arrangement. In addition, a sufficient lubrication gap is always guaranteed if the fluid dynamic bearing is designed as a hydrodynamic bearing. Even the minimum lubrication gap thickness possible in this context is dimensioned such that a sufficient lubricant flow is possible for the special type of bearing according to the invention. This lubricant flow is then also in particular such that no vortex flows resulting in an annoying acoustic disturbance occur in the lubricant within the lubricant gap of the hydrodynamic bearing. In particular, such a hydrodynamic bearing does not generate any self-exciting vortex flows in the lubricant.

A particularly preferred variant of the invention is such that the counter-bearing part is installed in a bearing housing or a housing part, that a preferably circumferential gap area is formed between an outer contour of the counter-bearing part and the bearing housing or the housing part, wherein the gap area is spatially connected to a lubricant guide channel. Preferably, the gap area and the support section can overlap at least sectionally in the direction of the axis of rotation. A trapped oil film can be generated in the gap area. This is possible because the gap area is connected to a lubricant supply, for instance using a pressure pump. In this way, by displacing the lubricant, a pressure and thus the load-bearing trapped oil film is generated in the gap area.

The bearing types used within the scope of the invention having a continuous and continuously differentiable bearing contour, which have different contour sections, are as such characterized by a particularly smooth-running and low-noise mode of operation. Therefore, the gap area can be dimensioned to provide a relatively soft damping effect of the trapped oil film. Consequently, a bearing design having a soft damping characteristic in the area of the trapped oil film is the result. And ultimately, because of the softer damping characteristic, a lower load capacity of the hydrodynamic bearing is required, resulting in a further reduction of the size of the hydrodynamic bearing, and thus its friction.

When the trapped oil film is designed having a soft damping characteristic to reduce the friction, it should also be noted that a soft damping characteristic entails an increased deflection of the rotor, which causes an increase in the contour gaps between the turbine or compressor wheel and the turbine or compressor wheel housing.

For this purpose and to adjust the damping characteristic, provision may be made within the scope of the invention that a relative clearance extending in the radial direction related to the outer diameter of the gap area in the range from 5 to 10 per mil is formed between the counter-bearing part and the bearing housing or the housing part in the gap area. A relative clearance in the range from 7 to 9 per mil, based on the outer diameter of the gap area, is particularly suitable for use in exhaust gas turbochargers of passenger cars. In this way, an advantageous compromise between the lowest possible deflection and the softest possible damping characteristics, for optimizing the overall efficiency of the turbocharger, consisting of compressor and turbine efficiency and the efficiency of the bearing is achieved.

The splitting area usually has the shape of a hollow cylinder. In principle, it is also conceivable that the gap area has a different geometry, in particular that of a hollow cone. In that case, where the gap area has a different geometry, the outer diameter referred to is the mean diameter.

According to a conceivable variant of the invention, provision may be made that the radial clearance between the counter-bearing part and the bearing housing or the housing part is greater than the radial clearance between the rotor part and the counter-bearing part.

According to one conceivable variant of the invention, the radial clearance between the counter-bearing part and the bearing housing (or the housing part) and the axial extension of the gap area is defined by the relation:

the axial extension of the gap area in millimeters equals 9 minus C times the radial clearance between the counter-bearing part and the bearing housing in millimeters, wherein C is in the range from 61 to 75. Preferably, C is selected in the range from 66 to 70.

In this way, a relatively soft damping characteristic can be achieved in the trapped oil film. This permits low radial bearing forces to be realized. In this way, the required axial bearing length and, consequently, the friction power can be reduced without having to put up with significant losses in the thermodynamic efficiency of the turbine and the compressor. This is of particular importance in high-speed applications, for instance modern exhaust gas turbochargers above 200,000 rpm.

In this context, the lower (because of the adapted damping characteristic) required load capacity of the hydrodynamic bearing can be implemented in particular by dimensioning the axial overlap in the direction of the axis of rotation between the counter-bearing part and the bearing housing or the housing part in the gap area for the formation of a trapped oil film such that the ratio of the extension of the gap area in the direction of the axis of rotation to the radial clearance between the counter-bearing part and the bearing housing or the housing part is:

the axial extension of the gap area in the direction of the axis of rotation/radial clearance=40 to 80.

Particularly preferably, this ratio can be selected in the range from 45 to 70.

To reduce the number of parts required, provision can be made for the rotor part to have a base part which is provided with at least one seal mount, in which a circumferential sealing element is inserted.

To be able to guarantee an exact assignment of the rotor part to the counter-bearing part, provision can be made according to one embodiment of the invention that the rotor part has a neck having a stop surface, and that the whole surface of the stop surface strikes against a radially extending surface of a collar of the rotor shaft.

The specified full-faced contact also renders the application of an axial clamping force to the rotor part possible, clamping it between a compressor wheel and the collar, preferably under the action of a screw connection, secured axially and secured non-rotatable in the circumferential direction. This measure results in a simple assembly with few parts.

As indicated above, the individual measures discussed above are particularly suitable in connection with a special advantageous bearing type according to the invention, wherein the continuous bearing contour, consisting of the two or more contour sections, of the rotor bearing surface and/or the counterface is designed to be continuously differentiable when cut longitudinally and through the axis of rotation in sectional view. With this type of bearing, fluid dynamic, in particular hydrodynamic, load capacities can be generated across the contour sections and preferably across the entire bearing contour in both the axial and the radial direction. The fluid dynamic, in particular hydrodynamic, bearing can be equipped with two or more lubricating keys as multi-surface plain bearings.

The continuous bearing contour varying in cross-section, in particular in the area of the converging gap of the fluid dynamic, in particular hydrodynamic, bearing, can be used to generate pressure areas that transfer both axial and radial loads. This results in 3-dimensional, fluid dynamic, in particular hydrodynamic, load capacities in the fluid dynamic, in particular hydrodynamic, bearing. The invention uses the physical effect according to which the locally generated fluid dynamic, in particular hydrodynamic, pressure acts normally on a surface. This results in local load capacities. Because the surface of the bearing contour can be designed three-dimensionally within the scope of the invention, this results in local force components with corresponding directions. The load capacity components of the bearing and thus the three-dimensional load capacity can be computed from the integral sum of the individual force components and then designed accordingly for the desired application.

As indicated above, the fluid dynamic, in particular hydrodynamic, plain bearings can be equipped with two or more lubricating keys as multi-surface plain bearings. Segmentation of the bearing in the area of the contour sections reduces friction. In addition, the axial load capacity of this bearing is also improved, because a continuous and continuously differentiable transition is created between the individual contour sections. This results in a higher overall load capacity while maintaining the same friction. Segmentation of the bearing arrangement also results in a further reduction in noise emission.

According to a possible variant of the invention, provision can be made that a preferably annular clearance space is formed in the direction of the axis of rotation between the rotor shaft and the rotor part, indirectly or directly next to the support section. This results in a definite support of the rotor part at the support section. In addition, owing to the shorter guide length of the rotor part assembly is simplified. Particularly preferably, provision can be made that the clearance space is formed by an enlargement of the diameter of that part of the rotor, which adjoins the bearing area of the rotor part. This simplifies the manufacturing process. In addition, the rotor shaft can then remain unaffected in this area, resulting in greater stability.

The invention is explained in greater detail below based on an exemplary embodiment shown in the drawings. In the Figures.

Figure 1:
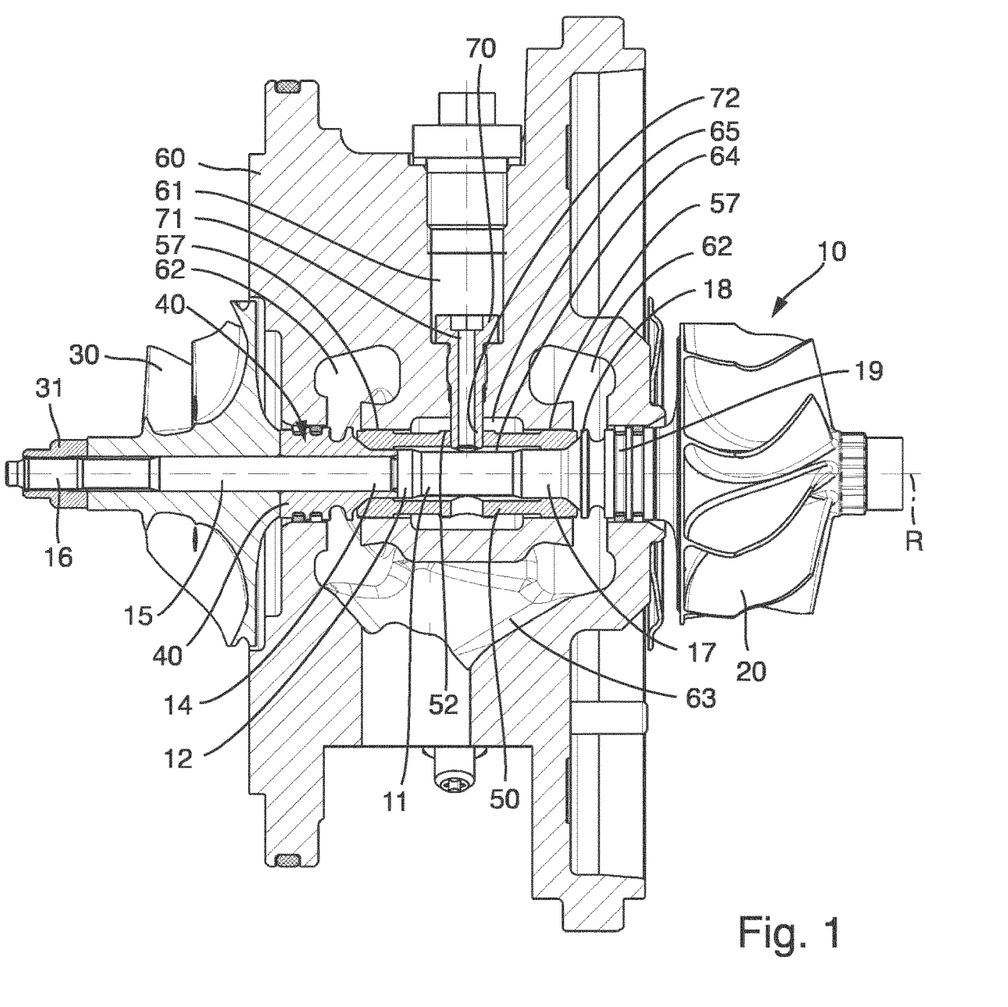
FIG. 1 shows a sectional view of an exhaust gas turbocharger.

FIG. 1 shows a side view and a section of an exhaust gas turbocharger. The exhaust gas turbocharger has a rotor 10 and a rotor shaft 11. The rotor shaft 11 has a center section that may be tapered. At its end facing the compressor, the center section has a stop 13. Accordingly, a circumferential collar 12 can be formed between the stop 13 and the taper of the center section. The stop 13 can be seen in FIG. 2. As this representation illustrates, the stop 13 can preferably be designed as a shaft shoulder having a radially aligned surface, which rotates in an annular manner. Adjacent to the collar 12, the rotor shaft 11 has a support section 14 on the compressor end. It can have the form of a circumferential machined surface. The support section 14 merges into a shaft section 15, which then terminates in a threaded section 16.

Figure 3:
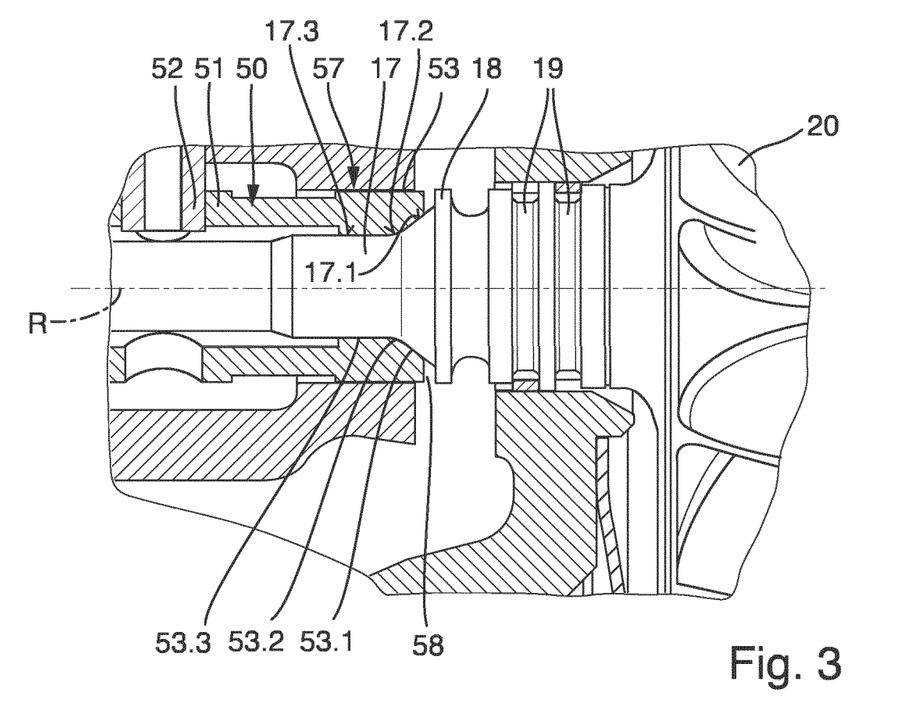

A bearing section 17 can preferably be provided on the end of the rotor shaft 11 opposite from the threaded section 16. The bearing section 17 may be formed from the rotor shaft 11 by machining the latter. As shown in FIG. 3, the bearing section 17 of the rotor shaft 11 has a circumferential bearing contour. This bearing contour has several contour sections 17.1 to 17.3 and is preferably formed integrally with the rotor shaft 11. The contour section 17.1 that transfers axial forces or radial and/or axial forces can, for instance, be designed frustoconical to absorb any radial forces. It can also be convex or concave in shape. The contour section 17.3 can be cylindrical. The contour section 17.2 interconnects two contour sections 17.1 and 17.3. The assignment is made such that the contour sections 17.1 to 17.3 merge continuously into one another and form the continuous bearing contour in that way. In a section through the axis of rotation R of the rotor shaft 11, as illustrated in FIG. 3, the bearing contour is designed to be continuously differentiable along the axis of rotation R. It is also conceivable that the contour sections 17.1 to 17.3 are formed by a multiple-times continuously differentiable function, and in that way form a bearing contour having a constant curvature.

Downstream of the contour section 17.1, the rotor shaft 11 may have a deflector 18 in the form of an oil slinger, for instance in the form of an enlarged diameter. In this exemplary embodiment, the enlarged diameter is formed as a circumferential collar. However, the deflector 18 can also have another suitable contour that effectively prevents or at least reduces oil leakage through the shaft passage in the bearing housing.

The rotor shaft 11 can also have at least one seal mount 19, as FIG. 3 shows. In this exemplary embodiment, two seal mounts 19, for instance in the form of piston ring grooves, arranged axially spaced apart from one another are used. Piston rings are inserted in the seal seats 19. A turbine wheel 20 is arranged at the end of the rotor shaft 11 opposite from the compressor wheel. The turbine wheel 20 is generally materially bonded to the rotor shaft 11.

The rotor 10 has a rotor part 40 on the end facing away from the turbine wheel 20. This rotor part 40 is illustrated magnified in FIG. 2. As this illustration shows, the rotor part 40 has a base part 41. The base part 41 can, for instance, have at least one circumferential seal mount 42 in the form of a piston ring groove. In this exemplary embodiment, two circumferential seal mounts 42 are used. Annular sealing elements 43 in the form of piston rings are inserted into the seal mount 42.

The rotor part 40 has a bearing section 44 adjacent to the base part 41. The bearing section 44 forms a circumferential bearing contour that may be similar or identical in design to the bearing contour having the contour sections 17.1 through 17.3, wherein the bearing section 44 has the contour sections 44.1 through 44.3 forming the bearing contour. The contour section 44.1 for absorbing the axial loads is preferably frustoconical, but can also be convex or concave. Furthermore, a cylindrical contour section 44.3 is again used to absorb radial loads. The two contour sections 44.1 and 44.3 are interconnected by the interposition of the contour section 44.2, or are merged into each other by means of the contour section 44.2. The contour section 44.2 can have a concave shape similar to the contour section 17.2. The contour sections 44.1 to 44.3 form the continuous bearing contour. In a section through the axis of rotation R according to FIG. 2, the bearing contour forms a continuous and continuously differentiable contour in sectional view. This can be clearly seen in the drawing, wherein the contour sections 44.1 to 44.3 merge continuously into one another without jumps in continuity. As with the bearing contour 17.1 to 17.3 at the turbine end, it is also conceivable that the contour sections 44.1 to 44.3 are formed by a function that can be continuously differentiated several times, and thus form a bearing contour having a continuous curvature.

Figure 2:
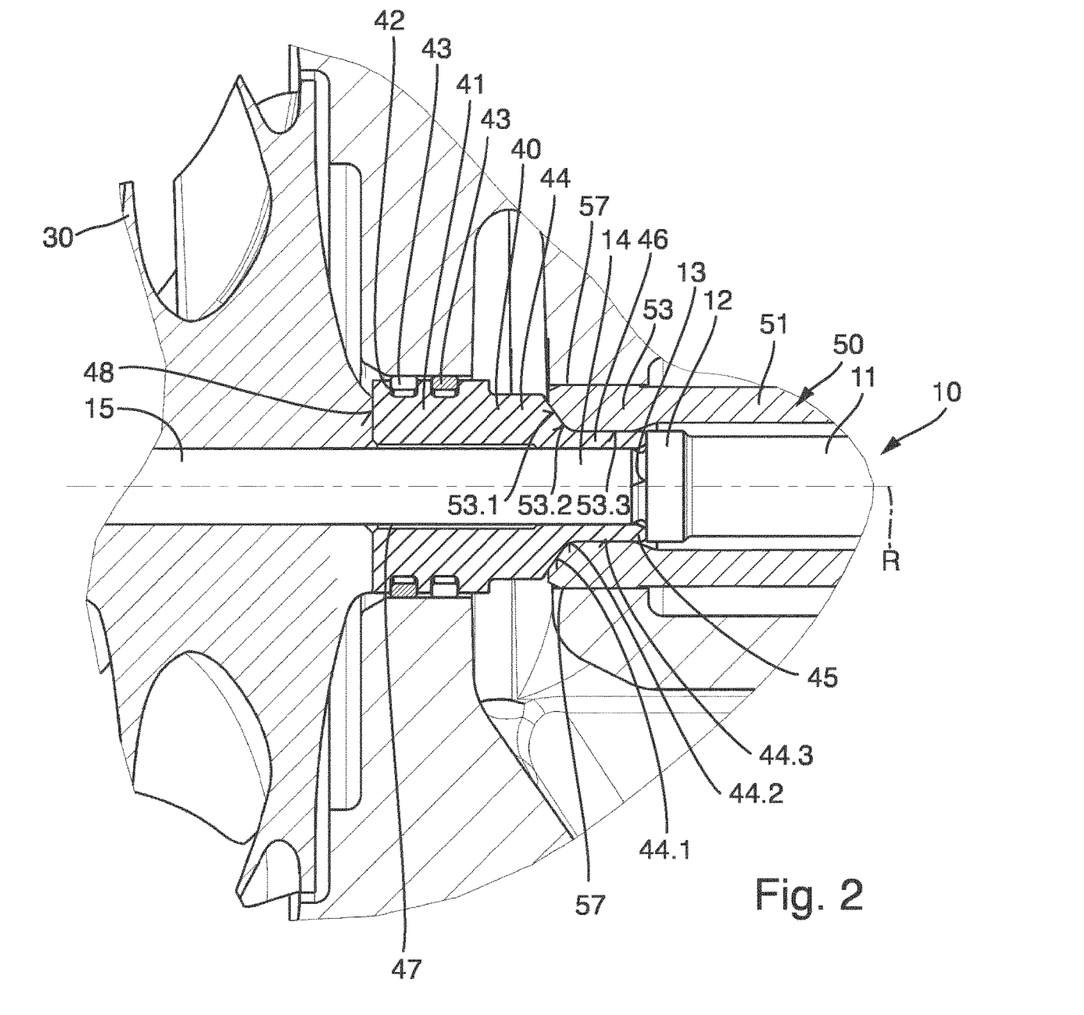
FIGS. 2 and 3 show enlarged detailed illustrations taken from FIG. 1.

At its end facing the collar 12, the rotor part 40 may have a neck 45. It is preferably formed by the bearing section 44. The end face of the neck 45 is radially aligned. In this way, the end face of the neck 45 rests against the stop 13 of the collar 12. To guarantee a flat contact, the neck 45 is chamfered all around on the inside. In addition, an undercut is lathed into the rotor shaft 11 adjoining the collar 12 for this purpose, as FIG. 2 shows.

The rotor member 40 abuts the support section 14 of the rotor shaft 11 at the bearing section 44 forming the bearing area 46. In this case, a snug fit is formed between the rotor part 40 and the rotor shaft 10, preferably in the form of a transition fit. Preferably, a transition fit in accordance with the ISO basic tolerance class IT3 to IT8 is implemented. The drilled hole, which is made in the bearing area 46 and is used to bear against the support section 14, has an enlarged diameter adjacent to the bearing area 46, forming a recess 47. By means of the recess 47, an annular clearance is obtained between the rotor part 40 and the outer circumference of the rotor shaft 11.

The base part 41 has an annular and radially extending contact surface 48. This contact surface 48 is thus parallel to the contact surface of the bearing section 44, which rests against the collar 12.

A compressor wheel 30 is pushed onto the rotor shaft 11 in the area of the shaft section 15. A radially extending contact surface of the compressor wheel 30 rests against the contact surface 48 of the rotor part 40. A nut 31 is bolted onto the threaded section 16 to secure the rotor part 40 and the compressor wheel 30. Consequently, the nut 31 clamps the compressor wheel 30 against the rotor part 40 and the rotor part 40 against the stop 13. In this way, both the compressor wheel 30 and the rotor part 40 are axially mounted on the rotor shaft 11 and secured thereon for co-rotation in the circumferential direction.

As can be seen in FIG. 1, the exhaust gas turbocharger has a counter-bearing part 50, which is inserted into a bearing housing 60 of the exhaust gas turbocharger. The counter-bearing part has a center part 51. Lugs 53 adjoin the center part 51 on both ends. The two lugs 53 each have a circumferential bearing contour. This circumferential bearing contour is designed complementary to the bearing contour formed by the rotor part 14 or the bearing section 17 of the rotor shaft 11. Accordingly, these bearing contours have contour sections 53.1 to 53.3, which can again be circumferential. The contour section 53.1 which absorbs the axial forces is, for instance, frustoconical and the contour section 53.3 is, for instance, cylindrical. The two contour sections 53.1 and 53.3 merge at least once in a continuously differentiable and continuous manner via the contour section 53.2.

To assemble the assembly according to FIG. 1 for an exhaust gas turbocharger, the counter-bearing part 50 is first inserted into a suitably prepared mount of the bearing housing 60. A locating element 70 is used to secure the predetermined position of the counter-bearing part 50 in the bearing housing 60 as shown in FIG. 1. The locating element 70 has a retaining section 72. This retaining section 72 engages with a locating mount 52 of the counter-bearing part 50. To mount the locating element 70, it can be inserted through a lubricant guide channel 61 of the bearing housing

60. To hold the locating element 70 captive, it can be screwed in, pressed in or secured with a retaining element to the bearing housing 60.

The rotor 10 can be installed after the counter-bearing part 50 is mounted in the bearing housing 60. For this purpose, the rotor shaft 11 is inserted into a drilled hole of the bearing housing 60 from the bearing housing end at the turbine end. The rotor shaft 11 passes through the counter-bearing part 50, as shown in FIG. 1. The insertion motion of the rotor 10 is limited by the contour section 17.1 of the rotor shaft 11, which rests against the associated contour section 53.1 of the counter-bearing part (see FIG. 3). In the assembled position, the sealing elements, which have been inserted into the circumferential seal mount 19, abut an associated annular sealing surface of the bearing housing 60 (see FIG. 3).

The rotor part 40 can now be inserted into the bearing housing 60 from the opposite end. In the process, the bearing area 46 of the rotor part 40 is pushed headfirst onto the rotor shaft 11. This is easily accomplished because the rotor part 40 is only guided with a precise fit on the rotor shaft 11 in the bearing area 46. In addition, the recess 47 does not impede the insertion motion. The rotor part 40 strikes against the collar 12 in the assembly position according to FIG. 2. Then the compressor wheel 30 is mounted on the rotor shaft 11 and the nut 31 is screwed on (see description above). In the assembled state, the rotor 10 is arranged such that its contour sections 53.1 to 53.3 on both lugs 53 are located opposite from the contour sections 17.1 to 17.3 and 44.1 to 44.3, respectively. In so doing, the allocation is made such that a bearing clearance is created in which two hydrodynamic films are guided to create two hydrodynamic bearings. The relative radial and the relative axial bearing clearance of every hydrodynamic bearing is preferably in the range from 1 to 5 per mil of the diameter of the contour sections 17.3 or 44.3 transferring radial forces.

As FIG. 1 shows, a circumferential gap area 57 is created between one, preferably both, lugs 53 of the counter-bearing part 50 and the bearing housing 60. This gap area has a relative radial clearance (absolute radial clearance/diameter of the counter-bearing part 50 in the gap area 57) extending in the radial direction in the range from 5 to 10 per mil, particularly preferably in the range from 7 to 9 per mil.

The gap area 57 is preferably arranged such that at least one of the contour sections 44.1 to 44.3 or 17.1 to 17.3 overlaps the gap area 57 in the direction of the axis of rotation R, particularly preferably the overlap is provided at least in the area of the contour sections 17.3 and 44.3, which provide a significant contribution to the load capacity of the hydrodynamic bearing in the radial direction. The axial overlap in the direction of the axis of rotation R between the counter-bearing part 50 and the bearing housing 60 in the gap area 57 is preferably such that the ratio of the extension of the gap area 57 in the direction of the axis of rotation R to the radial clearance between the counter-bearing part 50 and the bearing housing 60 or the housing part is:

the axial extension of the gap area 57 in the direction of the axis of rotation R/radial clearance=40 to 80

Particularly preferably, this ratio is in the range from 45 to 70.

A trapped oil film is created in the gap area 57 based one or more of the aforementioned dimensional specifications. This trapped oil film has high axial load capacity for the hydrodynamic bearings of the invention for common exhaust gas turbocharger applications. A trapped oil film designed with a suitable damping coefficient is particularly suitable for reducing the bearing forces that result in particular from an unbalance and from load change processes during operation. In this way, a particularly low-noise exhaust gas turbocharger is created on the one hand, and a friction-enhanced exhaust gas turbocharger on the other.

The two gap areas 57 are spatially connected to the lubricant guide channel 61. Pressurized lubricant can be supplied via the lubricant guide channel 61. It passes through a channel 71 of the locating element 70 into a chamber 64. From the chamber 64, the lubricant is forced into the gap areas 57. In this way, adaptable damping by means of the trapped oil film in the annular gap area 57 can be implemented. From the same chamber 64, the lubricant is also supplied to the two hydrodynamic bearings. Accordingly, the lubricant enters the area of the hydrodynamic gap formed between the contour sections 44.1 to 44.3 of the rotor 10 and the associated contour sections 53.1 to 53.3 of the counter-bearing part on the one hand and the contour sections 17.1 to 17.3 and the associated contour sections 53.1 to 53.3 on the other. As the rotor 10 rotates, the lubricant is directed across the hydrodynamic gap of the hydrodynamic journal bearings to generate a hydrodynamic pressure. Downstream of the hydrodynamic gap, the lubricant enters a centrifugal space 62. The gap areas 57, for instance, may also open into this centrifugal space 62. The lubricant is collected in a collection area 63 of the bearing housing 60, returned to the lubricant circuit and again routed to the lubricant guide channel 61.

According to FIG. 2, as mentioned above, the rotor part 40 is supported in the area of a support section 14 of the rotor shaft 11 relative to the rotor shaft 11.

Here, the assignment is such that the support section 14 and at least one of the contour sections 53.1 to 53.3 of the counter-bearing part 50 overlap in the direction of the axis of rotation R, at least sectionally. The overlap is preferably present in the area of the contour sections 17.3 or 44.3.

The invention claimed is:

1. An exhaust gas turbocharger having a hydrodynamic bearing, comprising:
 a rotor including:
  a rotor shaft including a support section, the rotor shaft having an axis of rotation; and
  a rotor part secured to the rotor shaft and supported on the support section of the rotor shaft, the rotor part including a rotor bearing surface;
 a counter-bearing part including a counterface, wherein the rotor bearing surface of the rotor part and the counterface of the counter-bearing part face each other to form the hydrodynamic bearing, and wherein each of the rotor bearing surface and the counterface, when viewed in a longitudinal section view including the axis of rotation, forms a continuous bearing contour including at least two merging contour sections configured to provide hydrodynamic load capacities in both a radial direction and an axial direction; and
 a bearing housing or a housing part, the counter-bearing part being mounted in the bearing housing or housing part such that a circumferential gap area for forming a trapped oil film is formed between an outer contour of the counter-bearing part and the bearing housing or the housing part, wherein the circumferential gap area is spatially connected to a lubricant guide channel, and wherein the circumferential gap area and the support section of the rotor shaft at least sectionally overlap in the direction of the axis of rotation;
 wherein a radial clearance between the counter-bearing part and the bearing housing or the housing part is greater than a radial clearance between the rotor bearing surface of the rotor part and the counterface of the counter-bearing part; and wherein the support section of the rotor shaft and at least one of the contour sections of the counter-bearing part overlap at least sectionally in the direction of the axis of rotation.

2. The exhaust gas turbocharger having the hydrodynamic bearing of claim 1, wherein:

the support section of the rotor shaft and at least one of the contour sections of the rotor bearing surface of the rotor part overlap at least sectionally in the direction of the axis of rotation.

3. The exhaust gas turbocharger having the hydrodynamic bearing of claim 1, wherein:

a radial clearance between the support section of the rotor shaft and the rotor part is smaller than a radial clearance between the contour sections of the rotor bearing surface of the rotor part and the counterface of the counter-bearing part.

4. The exhaust gas turbocharger having the hydrodynamic bearing of claim 3, wherein:

the radial clearance between the support section of the rotor shaft and the rotor part is less than 80% of the radial clearance between the contour sections of the rotor bearing surface of the rotor part and the counterface of the counter-bearing part.

5. The exhaust gas turbocharger having the hydrodynamic bearing of claim 3, wherein:

the radial clearance between the support section of the rotor shaft and the rotor part is less than 60% of the radial clearance between the contour sections of the rotor bearing surface of the rotor part and the counterface of the counter-bearing part.

6. The exhaust gas turbocharger having the hydrodynamic bearing of claim 1, wherein:

a snug fit is formed between the support section of the rotor shaft and the rotor part.

7. The exhaust gas turbocharger having the hydrodynamic bearing of claim 1, wherein:

a relative radial clearance between the counter-bearing part and the bearing housing or the housing part is in a range from 5 to 10 per mil with reference to an outer diameter of the circumferential gap area.

8. The exhaust gas turbocharger having the hydrodynamic bearing of claim 7, wherein:

the relative radial clearance between the counter-bearing part and the bearing housing or the housing part is in a range from 7 to 9 per mil with reference to the outer diameter of the circumferential gap area.

9. The exhaust gas turbocharger having the hydrodynamic bearing of claim 1, wherein:

the rotor part includes a base part including at least one seal mount for receiving a sealing element.

10. The exhaust gas turbocharger having the hydrodynamic bearing of claim 1, wherein:

the rotor shaft further includes a radially extending collar; and the rotor part includes a neck having a stop surface engaging the radially extending collar of the rotor shaft.

11. The exhaust gas turbocharger having the hydrodynamic bearing of claim 10, further comprising:

a compressor wheel received on the rotor shaft on a side of the rotor part opposite from the collar; and a retainer threadedly connected to the rotor shaft such that the rotor part is clamped between the compressor wheel and the collar and such that the rotor part is secured axially and non-rotatably in a circumferential direction relative to the rotor shaft.

12. The exhaust gas turbocharger having the hydrodynamic bearing of claim 1, wherein:

the continuous bearing contour of the rotor bearing surface or the counterface formed from the contour sections has a continuous curvature without a jump in continuity along at least a portion of the continuous bearing contour.

13. An exhaust gas turbocharger having a hydrodynamic bearing, comprising:

a rotor including:
a rotor shaft including a support section, the rotor shaft having an axis of rotation; and
a rotor part secured to the rotor shaft and supported on the support section of the rotor shaft, the rotor part including a rotor bearing surface;

a counter-bearing part including a counterface, wherein the rotor bearing surface of the rotor part and the counterface of the counter-bearing part face each other to form the hydrodynamic bearing, and wherein each of the rotor bearing surface and the counterface, when viewed in longitudinal section through the axis of rotation, forms a continuous bearing contour including at least two merging contour sections configured to provide hydrodynamic load capacities in both a radial direction and an axial direction; and a bearing housing or a housing part, the counter-bearing part being mounted in the bearing housing or housing part such that a circumferential gap area for forming a trapped oil film is formed between an outer contour of the counter-bearing part and the bearing housing or the housing part, wherein the circumferential gap area is spatially connected to a lubricant guide channel, and wherein the circumferential gap area and the support section of the rotor shaft at least sectionally overlap in the direction of the axis of rotation;

wherein the support section of the rotor shaft and at least one of the contour sections of the counter-bearing part overlap at least sectionally in the direction of the axis of rotation; and wherein an axial overlap in the direction of the axis of rotation between the counter-bearing part and the bearing housing or the housing part in the circumferential gap area for the formation of the trapped oil film is dimensioned such that a ratio of an extension of the circumferential gap area in the direction of the axis of rotation to a radial clearance between the counter-bearing part and the bearing housing or the housing part is in a range of from 40 to 80.

14. The exhaust gas turbocharger having the hydrodynamic bearing of claim 13, wherein:

the range is from 45 to 70.

15. An exhaust gas turbocharger having a hydrodynamic bearing, comprising:

a rotor including:
a rotor shaft including a support section, the rotor shaft having an axis of rotation; and
a rotor part secured to the rotor shaft and supported on the support section of the rotor shaft, the rotor part including a rotor bearing surface;

a counter-bearing part including a counterface, wherein the rotor bearing surface of the rotor part and the counterface of the counter-bearing part face each other to form the hydrodynamic bearing, and wherein each of the rotor bearing surface and the counterface, when viewed in longitudinal section through the axis of rotation, forms a continuous bearing contour including at least two merging contour sections configured to provide hydrodynamic load capacities in both a radial direction and an axial direction; and a bearing housing or a housing part, the counter-bearing part being mounted in the bearing housing or housing part such that a circumferential gap area for forming a trapped oil film is formed between an outer contour of the counter-bearing part and the bearing housing or the housing part, wherein the circumferential gap area is spatially connected to a lubricant guide channel, and wherein the circumferential gap area and the support section of the rotor shaft at least sectionally overlap in the direction of the axis of rotation;

wherein the support section of the rotor shaft and at least one of the contour sections of the counter-bearing part overlap at least sectionally in the direction of the axis of rotation; and wherein a radial clearance between the counter-bearing part and the bearing housing or the housing part in the circumferential gap area and an axial extension of the circumferential gap area are defined by the relation:

the axial extension of the circumferential gap area in millimeters equals 9 minus C times the radial clearance in millimeters, where C is in a range from 61 to 75.

16. The exhaust gas turbocharger having the hydrodynamic bearing of claim 15, wherein:

C is in a range from 66 to 70.

17. An exhaust gas turbocharger having a hydrodynamic bearing, comprising:

a rotor including:
  a rotor shaft including a support section, the rotor shaft having an axis of rotation; and
  a rotor part secured to the rotor shaft and supported on the support section of the rotor shaft, the rotor part including a rotor bearing surface;

a counter-bearing part including a counterface, wherein the rotor bearing surface of the rotor part and the counterface of the counter-bearing part face each other to form the hydrodynamic bearing, and wherein each of the rotor bearing surface and the counterface, when viewed in longitudinal section through the axis of rotation, forms a continuous bearing contour including at least two merging contour sections configured to provide hydrodynamic load capacities in both a radial direction and an axial direction;

wherein the support section of the rotor shaft and at least one of the contour sections of the counter-bearing part overlap at least sectionally in the direction of the axis of rotation;

wherein the rotor part includes a bearing area forming the contour sections of the rotor bearing surface and the rotor part includes a base part adjoining the bearing area; and wherein an annular clearance space is formed between the rotor shaft and an enlarged inner diameter of the base part of the rotor part.

* * * * *